(12) United States Patent
Dai et al.

(10) Patent No.: US 10,349,459 B2
(45) Date of Patent: Jul. 9, 2019

(54) RELAY NODE RN, DONOR ENODEB DENB AND COMMUNICATION METHOD

(71) Applicant: Huawei Technologies Co., Ltd., Shenzhen (CN)

(72) Inventors: Mingzeng Dai, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 478 days.

(21) Appl. No.: 15/257,600

(22) Filed: Sep. 6, 2016

(65) Prior Publication Data
US 2016/0374138 A1 Dec. 22, 2016

Related U.S. Application Data

(63) Continuation of application No. PCT/CN2014/073088, filed on Mar. 7, 2014.

(51) Int. Cl.
| | |
|---|---|
| *H04W 84/04* | (2009.01) |
| *H04W 88/04* | (2009.01) |
| *H04W 76/15* | (2018.01) |
| *H04W 72/04* | (2009.01) |
| *H04W 16/14* | (2009.01) |

(52) U.S. Cl.
CPC ....... *H04W 76/15* (2018.02); *H04W 72/0426* (2013.01); *H04W 88/04* (2013.01); *H04W 16/14* (2013.01); *H04W 84/047* (2013.01)

(58) Field of Classification Search
CPC ....... H04B 7/14; H04B 7/2125; H04L 1/1816; H04W 24/00; H04W 72/04; H04W 76/025; H04W 84/047; H04W 88/04; H04W 16/26; H04W 92/20
USPC .................................. 370/329; 455/7, 422.1
See application file for complete search history.

(56) References Cited

U.S. PATENT DOCUMENTS

| | | | |
|---|---|---|---|
| 9,294,232 B2 * | 3/2016 | Ostergaard | H04L 1/1685 |
| 9,538,438 B2 * | 1/2017 | Wang | H04W 36/04 |

(Continued)

FOREIGN PATENT DOCUMENTS

| | | |
|---|---|---|
| CN | 102111884 A | 6/2011 |
| CN | 20130301517 A1 | 7/2012 |

(Continued)

*Primary Examiner* — Raj Jain
(74) *Attorney, Agent, or Firm* — Leydig, Voit & Mayer, Ltd.

(57) ABSTRACT

A relay node RN, a donor eNodeB DeNB and a communication method are disclosed, where the RN includes: a sending module, configured to send an indication message to a donor eNodeB DeNB, where the indication message is used to indicate whether the RN supports data stream aggregation; a receiving module, configured to: when the DeNB determines, according to the indication message, that the RN supports data stream aggregation, receive a request sent by the DeNB, where the request is used to request to communicate with user equipment UE by means of data stream aggregation between the RN and the DeNB; and a configuration module, configured to reconfigure a bearer between the RN and the DeNB according to the request, where the sending module is further configured to instruct the DeNB to communicate with the UE by means of the data stream aggregation between the DeNB and the RN.

20 Claims, 4 Drawing Sheets

(56) References Cited

U.S. PATENT DOCUMENTS

| | | | |
|---|---|---|---|
| 2005/0207339 A1* | 9/2005 | Beshai | H04Q 3/0091 370/230 |
| 2011/0261747 A1* | 10/2011 | Wang | H04B 7/155 370/315 |
| 2012/0140701 A1* | 6/2012 | Huang | H04B 7/15528 370/315 |
| 2013/0279400 A1 | 10/2013 | Pan et al. | |
| 2013/0301517 A1 | 11/2013 | Chang et al. | |
| 2013/0336201 A1 | 12/2013 | Nishio et al. | |
| 2014/0269352 A1* | 9/2014 | Sun | H04W 72/1284 370/250 |
| 2016/0374138 A1* | 12/2016 | Dai | H04W 72/0426 |

FOREIGN PATENT DOCUMENTS

| | | |
|---|---|---|
| CN | 102761862 A | 10/2012 |
| EP | 2658147 A1 | 10/2013 |
| WO | WO 2012039656 A1 | 3/2012 |
| WO | WO 2012147296 A1 | 11/2012 |

\* cited by examiner

RELAY NODE RN, DONOR ENODEB DENB AND COMMUNICATION METHOD

CROSS-REFERENCE TO RELATED APPLICATIONS

This application is a continuation of International Application No. PCT/CN2014/073088, filed on Mar. 7, 2014, which is hereby incorporated by reference in its entirety.

TECHNICAL FIELD

The present invention relates to the field of communications technologies, and in particular, to a relay node RN, a donor eNodeB DeNB and a communication method.

BACKGROUND

With development of wireless communications technologies and an increase in requirements imposed by people on wireless communications services, wireless frequency occupied devices are increasingly large in quantity. A radio spectrum is a finite and non-renewable natural resource, and therefore, it is quite necessary to implement scientific, effective, and uniform management on spectrum resources and frequency occupied devices, so as to improve spectrum utilization and a spectrum management capability. By means of spectrum management, some spectrums are allocated to unlicensed users for use, and the spectrums become unlicensed spectrums. In the unlicensed spectrums, a 5-GHz bandwidth has not been widely applied currently, and therefore, application of an LTE (Long Term Evolution, Long Term Evolution) technology to 5 GHz becomes a trend. LTE is a next evolution target of a mobile broadband network standard defined by 3GPP (3rd Generation Partnership Project, 3rd Generation Partnership Project), and may implement efficient use on conventional and future wireless frequency bands. A higher applied frequency band (such as 5 GHz) indicates quicker electric wave propagation attenuation, and a shorter transmission distance, and therefore, an LTE-Advanced (LTE-A, LTE-Advanced) technology is introduced, that is, LTE-A is subsequent evolution of the LTE technology.

In the LTE-A technology, a relay node (RN, Relay Node) responsible for transferring and receiving a radio signal is added to an architecture of an access network. As shown in FIG. 1, FIG. 1 is a schematic diagram of a network architecture of conventional LTE-A. In FIG. 1, a radio link between user equipment (UE, User Equipment) and an RN is an access link, and an air interface of the radio link may be referred to as a Uu interface. A radio link between the RN and a donor eNodeB (DeNB, Donor eNB) is a backhaul link, and an air interface of the radio link may be referred to as a Un interface. The DeNB and a mobility management entity/serving gateway (MME/SGW, Mobility Management Entity/Serving Gateway) of a core network are connected to each other by using an S1 interface. The DeNB mainly provides routing relay functions of the S1 interface and an X2 interface, and is used to transit connection between the RN and another node, and the RN used as a cell is mainly used to transmit data, and used to supplement coverage and improve system capacity. When needing to communicate with the MME, the UE needs to be connected to the MME by using the S1 interface of the RN and by means of the DeNB. In this case, the RN seems to directly transfer a data stream to the MME. Therefore, messages and data sent by the S1 interface all first reach the DeNB, and then forwarded to the RN or the core network, and in this process, the DeNB provides only the routing relay function of the S1 interface.

Generally, the RN is a low-power node, and responds to relatively small RN coverage, which cannot ensure business continuity in a high-speed movement scenario. Moreover, because a serial transmission manner is used for the S1 interface, data can be sent to the user equipment by using only the RN node, and in a scenario such as a network congestion scenario or an RN coverage boundary scenario, resource utilization of the donor eNodeB and the RN node cannot be effectively and dynamically coordinated, and optimal performance of a system cannot be achieved.

SUMMARY

Embodiments of the present invention provide a relay node RN, a donor eNodeB DeNB and a communication method, where the RN supports a data stream aggregation technology, and shares a load of data transmission for the DeNB, thereby improving a throughput rate of a user in a case of ensuring business continuity.

According to a first aspect of the embodiments of the present invention, a relay node RN is provided, and includes:

a sending module, configured to send an indication message to a donor eNodeB DeNB, where the indication message is used to indicate whether the RN supports data stream aggregation;

a receiving module, configured to: when the DeNB determines, according to the indication message, that the RN supports data stream aggregation, receive a request sent by the DeNB, where the request is used to request to communicate with user equipment UE by means of data stream aggregation between the RN and the DeNB; and a configuration module, configured to reconfigure a bearer between the RN and the DeNB according to the request, where the sending module is further configured to instruct the DeNB to communicate with the UE by means of the data stream aggregation between the DeNB and the RN.

With reference to an implementation manner of the first aspect of the embodiments of the present invention, in a first possible implementation manner of the first aspect of the embodiments of the present invention, the RN further includes:

a switch-off module, configured to: when it is detected that signal interference is greater than a preset threshold, switch off the RN, and send a switch-off message to the DeNB, where the switch-off message is used to instruct to switch off the RN.

With reference to the first possible implementation manner of the first aspect of the embodiments of the present invention, in a second possible implementation manner of the first aspect of the embodiments of the present invention, the RN further includes:

a switch-on module, configured to receive a switch-on message sent by the DeNB, where the switch-on message is used to instruct to switch on the RN.

With reference to either the first or second possible implementation manner of the first aspect of the embodiments of the present invention, in a third possible implementation manner of the first aspect of the embodiments of the present invention, a manner in which the switch-off module sends the switch-off message or the switch-on module receives the switch-on message includes any one of the following:

a physical control channel, a Medium Access Control-control element, or radio resource control signaling.

With reference to any one of the first aspect to the third possible implementation manner of the first aspect of the embodiments of the present invention, in a fourth possible implementation manner of the first aspect, the indication message is further used to instruct the RN to work in an unlicensed spectrum.

With reference to any one of the first aspect to the fourth possible implementation manner of the first aspect of the embodiments of the present invention, in a fifth possible implementation manner of the first aspect of the embodiments of the present invention, the request that is sent by the DeNB and that is received by the receiving module further includes:

a quality of service QoS parameter, where the QoS parameter is used to reconfigure the bearer between the RN and the DeNB; and the configuration module is specifically configured to:
reconfigure the bearer between the RN and the DeNB according to the QoS parameter.

With reference to any one of the first aspect to the fifth possible implementation manner of the first aspect of the embodiments of the present invention, in a sixth possible implementation manner of the first aspect of the embodiments of the present invention, the request further includes path information of an interface between the RN and the DeNB and an identifier of the UE.

With reference to any one of the first aspect to the sixth possible implementation manner of the first aspect of the embodiments of the present invention, in a seventh possible implementation manner of the first aspect of the embodiments of the present invention, the receiving module is specifically configured to:

receive a radio resource control RRC message sent by the DeNB, where the RRC message includes the request.

According to a second aspect of the embodiments of the present invention, a relay node RN is provided, and includes an input apparatus, an output apparatus, a memory and a processor, where the memory is configured to store a program, and the processor is configured to invoke the program to execute the following steps:

sending an indication message to a donor eNodeB DeNB by using the output apparatus, where the indication message is used to indicate whether the RN supports data stream aggregation;

when the DeNB determines, according to the indication message, that the RN supports data stream aggregation, receiving, by using the input apparatus, a request sent by the DeNB, where the request is used to request to communicate with user equipment UE by means of data stream aggregation between the RN and the DeNB;

reconfiguring a bearer between the RN and the DeNB according to the request; and instructing, by using the output apparatus, the DeNB to communicate with the UE by means of the data stream aggregation between the DeNB and the RN.

With reference to an implementation manner of the second aspect of the embodiments of the present invention, in a first possible implementation manner of the second aspect of the embodiments of the present invention, the processor further executes the following step:

when it is detected that signal interference is greater than a preset threshold, switching off the RN, and sending a switch-off message to the DeNB by using the output apparatus, where the switch-off message is used to instruct to switch off the RN.

With reference to the first possible implementation manner of the second aspect of the embodiments of the present invention, in a second possible implementation manner of the second aspect of the embodiments of the present invention, the processor further executes the following step:

receiving, by using the input apparatus, a switch-on message sent by the DeNB, where the switch-on message is used to instruct to switch on the RN.

With reference to either the first or second possible implementation manner of the second aspect of the embodiments of the present invention, in a third possible implementation manner of the second aspect of the embodiments of the present invention, a manner in which the processor sends the switch-off message or receives the switch-on message includes any one of the following:

a physical control channel, a Medium Access Control-control element, or radio resource control signaling.

With reference to any one of the second aspect to the third possible implementation manner of the second aspect of the embodiments of the present invention, in a fourth possible implementation manner of the second aspect, the indication message is further used to instruct the RN to work in an unlicensed spectrum.

With reference to any one of the second aspect to the fourth possible implementation manner of the second aspect of the embodiments of the present invention, in a fifth possible implementation manner of the second aspect of the embodiments of the present invention, the request that is sent by the DeNB and that is received by the processor by using the input apparatus further includes:

a quality of service QoS parameter, where the QoS parameter is used to reconfigure the bearer between the RN and the DeNB; and the processor reconfigures the bearer between the RN and the DeNB according to the request, and executes the following step:

reconfiguring the bearer between the RN and the DeNB according to the QoS parameter.

With reference to any one of the second aspect to the fifth possible implementation manner of the second aspect of the embodiments of the present invention, in a sixth possible implementation manner of the second aspect of the embodiments of the present invention, the request further includes path information of an interface between the RN and the DeNB and an identifier of the UE.

With reference to any one of the second aspect to the sixth possible implementation manner of the second aspect of the embodiments of the present invention, in a seventh possible implementation manner of the second aspect of the embodiments of the present invention, the processor receives, by using the input apparatus, the request sent by the DeNB, and executes the following step:

receiving, by using the input apparatus, a radio resource control RRC message sent by the DeNB, where the RRC message includes the request.

According to a third aspect of the embodiments of the present invention, a donor eNodeB DeNB is provided, and includes:

a receiving module, configured to receive an indication message sent by a relay node RN, where the indication message is used to indicate whether the RN supports data stream aggregation; and a sending module, configured to: when it is determined according to the indication message that the RN supports data stream aggregation, send a request to the RN, where the request is used to request to communicate with user equipment UE by means of data stream aggregation between the DeNB and the RN, where the receiving module is further configured to receive an indication of the RN, so as to communicate with the UE by means of the data stream aggregation between the DeNB and the RN.

With reference to an implementation manner of the third aspect of the embodiments of the present invention, in a first possible implementation manner of the third aspect of the embodiments of the present invention, the receiving module is further configured to: when the RN detects that signal interference is greater than a preset threshold, receive a switch-off message sent by the RN, where the switch-off message is used to instruct to switch off the RN.

With reference to the first possible implementation manner of the third aspect of the embodiments of the present invention, in a second possible implementation manner of the third aspect of the embodiments of the present invention, the sending module is further configured to send a switch-on message to the RN, where the switch-on message is used to instruct to switch on the RN.

With reference to either the first or second possible implementation manner of the third aspect of the embodiments of the present invention, in a third possible implementation manner of the third aspect of the embodiments of the present invention, a manner in which the receiving module receives the switch-off message or the sending module sends the switch-on message includes any one of the following:

a physical control channel, a Medium Access Control-control element, or radio resource control signaling.

With reference to any one of the third aspect to the third possible implementation manner of the third aspect of the embodiments of the present invention, in a fourth possible implementation manner of the third aspect, the indication message received by the receiving module is further used to instruct the RN to work in an unlicensed spectrum.

With reference to any one of the third aspect to the fourth possible implementation manner of the third aspect of the embodiments of the present invention, in a fifth possible implementation manner of the third aspect of the embodiments of the present invention, the request sent by the sending module to the RN further includes:

a quality of service QoS parameter, where the QoS parameter is set by the DeNB according to a QoS requirement for configuring data stream aggregation, and is used to reconfigure a bearer between the DeNB and the RN.

With reference to any one of the third aspect to the fifth possible implementation manner of the third aspect of the embodiments of the present invention, in a sixth possible implementation manner of the third aspect of the embodiments of the present invention, the request further includes path information of an interface between the DeNB and the RN and an identifier of the UE.

With reference to any one of the third aspect to the sixth possible implementation manner of the third aspect of the embodiments of the present invention, in a seventh possible implementation manner of the third aspect of the embodiments of the present invention, the sending module is specifically configured to:

send a radio resource control RRC message to the RN, where the RRC message includes the request.

According to a fourth aspect of the embodiments of the present invention, a donor eNodeB DeNB is provided, where the DeNB includes an input apparatus, an output apparatus, a memory and a processor, where the memory is configured to store a program, and the processor is configured to invoke the program to execute the following steps:

receiving, by using the input apparatus, an indication message sent by a relay node RN, where the indication message is used to indicate whether the RN supports data stream aggregation;

when it is determined according to the indication message that the RN supports data stream aggregation, sending a request to the RN by using the output apparatus, where the request is used to request to communicate with user equipment UE by means of data stream aggregation between the DeNB and the RN; and receiving an indication of the RN by using the input apparatus, so as to communicate with the UE by means of the data stream aggregation between the DeNB and the RN.

With reference to an implementation manner of the fourth aspect of the embodiments of the present invention, in a first possible implementation manner of the fourth aspect of the embodiments of the present invention, the processor further executes the following step:

when the RN detects that signal interference is greater than a preset threshold, receiving, by using the input apparatus, a switch-off message sent by the RN, where the switch-off message is used to instruct to switch off the RN.

With reference to the first possible implementation manner of the fourth aspect of the embodiments of the present invention, in a second possible implementation manner of the fourth aspect of the embodiments of the present invention, the processor further executes the following step:

sending a switch-on message to the RN by using the output apparatus, where the switch-on message is used to instruct to switch on the RN.

With reference to either the first or second possible implementation manner of the fourth aspect of the embodiments of the present invention, in a third possible implementation manner of the fourth aspect of the embodiments of the present invention, a manner in which the processor receives the switch-off message or sends the switch-on message includes any one of the following:

a physical control channel, a Medium Access Control-control element, or radio resource control signaling.

With reference to any one of the fourth aspect to the third possible implementation manner of the fourth aspect of the embodiments of the present invention, in a fourth possible implementation manner of the fourth aspect, the indication message received by the processor is further used to instruct the RN to work in an unlicensed spectrum.

With reference to any one of the fourth aspect to the fourth possible implementation manner of the fourth aspect of the embodiments of the present invention, in a fifth possible implementation manner of the fourth aspect of the embodiments of the present invention, the request that is sent by the processor to the RN by using the output apparatus further includes:

a quality of service QoS parameter, where the QoS parameter is set by the processor according to a QoS requirement for configuring data stream aggregation, and is used to reconfigure a bearer between the DeNB and the RN.

With reference to any one of the fourth aspect to the fifth possible implementation manner of the fourth aspect of the embodiments of the present invention, in a sixth possible implementation manner of the fourth aspect of the embodiments of the present invention, the request further includes path information of an interface between the DeNB and the RN and an identifier of the UE.

With reference to any one of the fourth aspect to the sixth possible implementation manner of the fourth aspect of the embodiments of the present invention, in a seventh possible implementation manner of the fourth aspect of the embodiments of the present invention, the processor sends the request to the RN by using the output apparatus, and executes the following step:

sending a radio resource control RRC message to the RN by using the output apparatus, where the RRC message includes the request.

According to a fifth aspect of the embodiments of the present invention, a communication method is provided, and includes:

sending, by a relay node RN, an indication message to a donor eNodeB DeNB, where the indication message is used to indicate whether the RN supports data stream aggregation;

when the DeNB determines, according to the indication message, that the RN supports data stream aggregation, receiving, by the RN, a request sent by the DeNB, where the request is used to request to communicate with user equipment UE by means of data stream aggregation between the RN and the DeNB;

reconfiguring, by the RN, a bearer between the RN and the DeNB according to the request; and instructing, by the RN, the DeNB to communicate with the UE by means of the data stream aggregation between the DeNB and the RN.

With reference to an implementation manner of the fifth aspect of the embodiments of the present invention, in a first possible implementation manner of the fifth aspect of the embodiments of the present invention, the method further includes:

when the RN detects that signal interference is greater than a preset threshold, switching off the RN, and sending a switch-off message to the DeNB, where the switch-off message is used to instruct to switch off the RN.

With reference to the first possible implementation manner of the fifth aspect of the embodiments of the present invention, in a second possible implementation manner of the fifth aspect of the embodiments of the present invention, the method further includes:

receiving, by the RN, a switch-on message sent by the DeNB, where the switch-on message is used to instruct to switch on the RN.

With reference to either the first or second possible implementation manner of the fifth aspect of the embodiments of the present invention, in a third possible implementation manner of the fifth aspect of the embodiments of the present invention, a manner in which the RN sends the switch-off message or receives the switch-on message includes any one of the following:

a physical control channel, a Medium Access Control-control element, or radio resource control signaling.

With reference to any one of the fifth aspect to the third possible implementation manner of the fifth aspect of the embodiments of the present invention, in a fourth possible implementation manner of the fifth aspect, the indication message is further used to instruct the RN to work in an unlicensed spectrum.

With reference to any one of the fifth aspect to the fourth possible implementation manner of the fifth aspect of the embodiments of the present invention, in a fifth possible implementation manner of the fifth aspect of the embodiments of the present invention, the request that is sent by the DeNB and that is received by the RN further includes:

a quality of service QoS parameter, where the QoS parameter is used to reconfigure the bearer between the RN and the DeNB; and the reconfiguring, by the RN, a bearer between the RN and the DeNB according to the request specifically includes:

reconfiguring, by the RN, the bearer between the RN and the DeNB according to the QoS parameter.

With reference to any one of the fifth aspect to the fifth possible implementation manner of the fifth aspect of the embodiments of the present invention, in a sixth possible implementation manner of the fifth aspect of the embodiments of the present invention, the request further includes path information of an interface between the RN and the DeNB and an identifier of the UE.

With reference to any one of the fifth aspect to the sixth possible implementation manner of the fifth aspect of the embodiments of the present invention, in a seventh possible implementation manner of the fifth aspect of the embodiments of the present invention, the receiving, by the RN, a request sent by the DeNB specifically includes:

receiving, by the RN, a radio resource control RRC message sent by the DeNB, where the RRC message includes the request.

According to a sixth aspect of the embodiments of the present invention, a computer storage medium is provided, where a program can be stored in the computer storage medium, and when being executed, the program executes all or some steps of the communication method provided in the fifth aspect of the embodiments of the present invention.

According to a seventh aspect of the embodiments of the present invention, a communication method is provided, and includes:

receiving, by a donor eNodeB DeNB, an indication message sent by a relay node RN, where the indication message is used to indicate whether the RN supports data stream aggregation;

when the DeNB determines, according to the indication message, that the RN supports data stream aggregation, sending, by the DeNB, a request to the RN, where the request is used to request to communicate with user equipment UE by means of data stream aggregation between the DeNB and the RN; and receiving, by the DeNB, an indication of the RN, so as to communicate with the UE by means of the data stream aggregation between the DeNB and the RN.

With reference to an implementation manner of the seventh aspect of the embodiments of the present invention, in a first possible implementation manner of the seventh aspect of the embodiments of the present invention, the method further includes:

when the RN detects that signal interference is greater than a preset threshold, receiving, by the DeNB, a switch-off message sent by the RN, where the switch-off message is used to instruct to switch off the RN.

With reference to the first possible implementation manner of the seventh aspect of the embodiments of the present invention, in a second possible implementation manner of the seventh aspect of the embodiments of the present invention, the method further includes:

sending, by the DeNB, a switch-on message to the RN, where the switch-on message is used to instruct to switch on the RN.

With reference to either the first or second possible implementation manner of the seventh aspect of the embodiments of the present invention, in a third possible implementation manner of the seventh aspect of the embodiments of the present invention, a manner in which the DeNB receives the switch-off message or sends the switch-on message includes any one of the following:

a physical control channel, a Medium Access Control-control element, or radio resource control signaling.

With reference to any one of the seventh aspect to the third possible implementation manner of the seventh aspect of the embodiments of the present invention, in a fourth possible implementation manner of the seventh aspect, the indication message received by the DeNB is further used to instruct the RN to work in an unlicensed spectrum.

With reference to any one of the seventh aspect to the fourth possible implementation manner of the seventh aspect of the embodiments of the present invention, in a fifth possible implementation manner of the seventh aspect of the embodiments of the present invention, the request sent by the DeNB to the RN further includes:

a quality of service QoS parameter, where the QoS parameter is set by the DeNB according to a QoS requirement for configuring data stream aggregation, and is used to reconfigure a bearer between the DeNB and the RN.

With reference to any one of the seventh aspect to the fifth possible implementation manner of the seventh aspect of the embodiments of the present invention, in a sixth possible implementation manner of the seventh aspect of the embodiments of the present invention, the request further includes path information of an interface between the DeNB and the RN and an identifier of the UE.

With reference to any one of the seventh aspect to the sixth possible implementation manner of the seventh aspect of the embodiments of the present invention, in a seventh possible implementation manner of the seventh aspect of the embodiments of the present invention, the sending, by the DeNB, a request to the RN specifically includes:

sending, by the DeNB, a radio resource control RRC message to the RN, where the RRC message includes the request.

According to an eighth aspect of the embodiments of the present invention, a computer storage medium is provided, where a program can be stored in the computer storage medium, and when being executed, the program executes all or some steps of the communication method provided in the seventh aspect of the embodiments of the present invention.

By means of the embodiments of the present invention, an RN is provided, to support a data stream aggregation technology by reconfiguring a Un bearer. After the RN is added, a DeNB communicates with UE by means of data stream aggregation, by using some user data, and by using the RN, thereby improving a throughput rate of a user in a case of ensuring business continuity. In the data stream aggregation technology, the user equipment UE may receive data from or transmit data to the DeNB and the RN at the same time, where the DeNB mainly provides functions such as mobility management, and improves business continuity of the UE in high-speed movement by using wide coverage of the DeNB, and the RN node is mainly configured to undertake sending of data, and improve a throughput rate of a user.

BRIEF DESCRIPTION OF DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

By means of the embodiments of the present invention, an RN supports a data stream aggregation technology, and shares a load of data transmission for a DeNB, thereby improving a throughput rate of a user in a case of ensuring business continuity.

Figure 1:
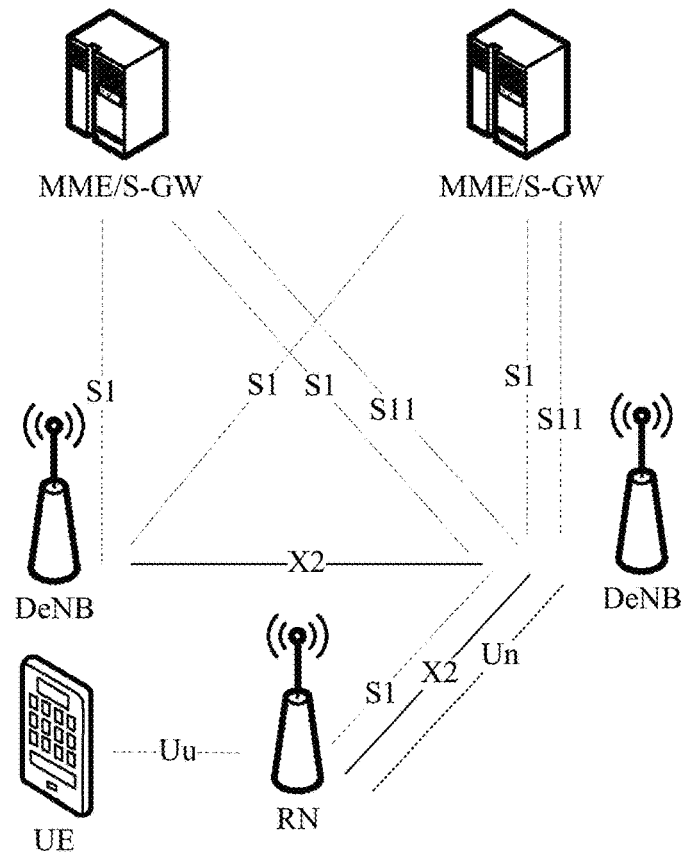
FIG. 1 is a schematic diagram of a network architecture in an LTE-A system in the prior art.
Figure 2:
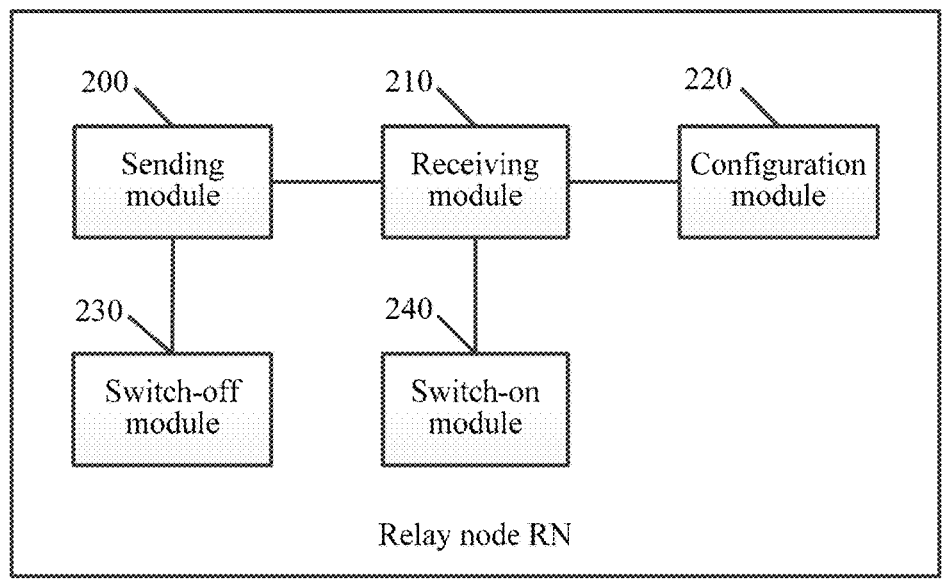
FIG. 2 is a schematic structural diagram of an embodiment of a relay node RN according to an embodiment of the present invention.

Referring to FIG. 2, FIG. 2 is a schematic structural diagram of an embodiment of a relay node RN according to an embodiment of the present invention. The RN involved in this embodiment of the present invention may be used as a secondary eNodeB of a DeNB, and be directly connected to the DeNB by using a wireless interface. For example, the foregoing RN may work in an unlicensed spectrum, and perform data transmission by using a data stream aggregation technology. In the data stream aggregation technology, the RN does not need to establish an S1 interface with the DeNB, that is, does not need to be connected to a core network by using the S1 interface and by means of the DeNB.

The data stream aggregation technology involved in this embodiment of the present invention may be a dual connectivity/multiple stream aggregation (DC/MSA, Dual Connectivity/Multiple Stream Aggregation) technology, where the DC/MSA technology refers to a carrier aggregation technology between two eNodeBs, and can effectively satisfy a requirement of an LTE-A system for a frequency band. In the DC/MSA technology, on one hand, multiple LTE carriers are directly aggregated, to satisfy a requirement that the LTE-A system needs a large bandwidth, and a physical channel and a modulation and coding scheme do not need to be re-designed; on the other hand, conventional LTE system resources are multiplexed, to complete aggregation on scattered bandwidths at a minimum price, thereby implementing high-speed transmission of a data stream. In this embodiment of the present invention, the MSA technology is exemplified.

UE involved in this embodiment of the present invention may be a mobile terminal, a personal digital assistant or another mobile electronic communications device that supports data stream aggregation. The UE needs to have a radio access network service request capability, and may be operated in a wide-area cellular network frequency band, or may be operated in a radio access network frequency band (such as a GAN frequency band and/or a UMA frequency band).

The RN involved in this embodiment of the present invention includes a sending module 200, a receiving module 210 and a configuration module 220.

The sending module 200 is configured to send an indication message to a donor eNodeB DeNB, where the indication message is used to indicate whether the RN supports data stream aggregation.

In an initial state, the RN sends the indication message to the DeNB, where the indication message is used to indicate whether the RN supports an MSA technology. If the indication message is transmitted by using a Un interface, a radio resource control (RRC, Radio Resource Control) connection needs to be established. In this case, the indication message may be an RRC message, such as relay type information (RN Type Information). A radio resource control protocol is used to process third-layer information of a control plane between the UE and the DeNB, where a first layer is a physical layer, a second layer is a Medium Access Control layer, and RRC is a third layer. The RRC allocates a radio resource and sends related signaling, and the RRC message carries all parameters needed by establishment, modification and a physical layer protocol entity, is responsible for broadcasting network system information to the UE, and is involved in coordination of different radio resource bearers related to the RRC connection. The RN also has a radio resource control protocol, and therefore the RN may establish an RRC connection to the DeNB.

In an implementable manner, the DeNB further provides a routing relay function of an X2 interface, and if the indication message is transmitted by using the X2 interface (an eNB ID of the RN is the same as that of the DeNB, and therefore the RN also has some interfaces of the DeNB, such as the X2 interface), an X2 message may be re-defined. By contrast, because the Un interface is an air interface, the Un interface is less limited to a region, and has a quicker transmission speed. The X2 interface is used to transmit user data between base stations, and implement data forwarding. In this embodiment of the present invention, the RN may be used as a secondary eNodeB of the DeNB, and still has a function of an eNodeB, and the RN may also transmit data with the DeNB by using the X2 interface.

In an implementable manner, the indication message is further used to instruct the RN to work in an unlicensed spectrum.

The receiving module 210 is configured to: when the DeNB determines, according to the indication message, that the RN supports data stream aggregation, receive a request sent by the DeNB, where the request is used to request to communicate with user equipment UE by means of data stream aggregation between the RN and the DeNB.

In specific implementation, when the DeNB determines according to the received indication message that the RN supports the MSA technology, if an RRC connection is established between the DeNB and the RN, the DeNB sends a request to the receiving module 210 of the RN, where the request is used to communicate with the user equipment UE by using the MSA technology between the RN and the DeNB.

In an implementable manner, the request received by the RN may be an RRC message.

In an implementable manner, the request received by the receiving module 210 further includes a quality of service (QoS, Quality of Service) parameter, where the QoS parameter is used to reconfigure a bearer between the RN and the DeNB, that is, a Un bearer. The QoS parameter is set by the DeNB according to a QoS requirement for configuring data stream aggregation. The QoS requirement may specifically refer to a bandwidth of the Un interface, and to satisfy MSA, the bandwidth of the Un interface therefore needs to be adjusted and enlarged. By modifying the QoS parameter, the bandwidth of the Un interface can be adjusted and enlarged, thereby ensuring that an important traffic volume is not delayed or discarded when a network is overloaded or congested, and ensuring efficient running of the network. The Un interface of the RN in this embodiment of the present invention is used to transmit a data stream obtained after data stream aggregation, and modification on the QoS parameter of the Un bearer can configure data stream aggregation for the RN to satisfy requirements of a service such as a rate and a time delay, and therefore the DeNB needs to set the QoS parameter of the Un bearer according to a situation of data offloaded to the RN, that is, a situation of the bandwidth of the Un interface.

In an implementable manner, the request further includes path information of an interface between the RN and the DeNB and an identifier of the UE. The path information is used to indicate a path of transfer from the RN to an interface of the DeNB, and is also used to indicate a path of transfer from the RN to an interface of the UE. Information about the identifier of the UE may be a context of the UE, where the context of the UE includes a network capability of the UE, an ID of the DeNB, authentication information, a generated key, information about a created connection, bearer information and the like, and before the UE is not separated from the RN, these pieces of information all need to be saved by the UE.

In an implementable manner, the receiving module 210 may receive an RRC message sent by the DeNB, where the RRC message includes the request. The request may be further encapsulated into an encapsulation packet, which is carried by the RRC message, and carrying by using RRC message can ensure that the QoS parameter of the Un bearer meets a requirement of satisfying MSA, and reduce increase in the time delay of the RN, thereby sharing a load of the user data by using the MSA technology. Because the Un interface is an air interface, the Un interface is less limited to a region, and has wider coverage and a quicker transmission speed. Generally, the RN and the DeNB communicate with each other by using the Un interface.

The configuration module 220 is configured to reconfigure a bearer between the RN and the DeNB according to the request.

In an implementable manner, the configuration module 220 reconfigures the bearer between the RN and the DeNB according to the QoS parameter, that is, the Un bearer, so that the bandwidth of the Un bearer can support the MSA technology, and communication with the user equipment UE is performed by using the MSA technology between the RN and the DeNB.

The sending module 200 is further configured to instruct the DeNB to communicate with the UE by means of the data stream aggregation between the DeNB and the RN.

In specific implementation, after the configuration module 220 reconfigures the Un bearer according to the QoS parameter, the sending module 200 instructs the DeNB to communicate with the UE by using the MSA.

In an implementable manner, the sending module 200 may send, to the DeNB, the indication message for determining modification, where the indication message not only may be a new RRC message, but also may be encapsulated into an encapsulation packet, which is carried by the RRC message.

In an implementable manner, the RN further includes a switch-off module 230.

The switch-off module 230 is configured to: when it is detected that signal interference is greater than a preset threshold, switch off the RN, and send a switch-off message to the DeNB, where the switch-off message is used to instruct to switch off the RN.

In specific implementation, when the RN working in the unlicensed spectrum detects signal interference, that is, detects interference generated by WiFi or detects that a radar signal is greater than a preset threshold value, the RN may be rapidly switched off according to an interference situation, and the RN is entirely switched off, and feeds back a switch-off state of the RN to the DeNB by using the Un interface.

In an implementable manner, a manner in which the switch-off module 230 sends the switch-off message may be any one of a physical uplink control channel (PUCCH, Physical Uplink Control Channel) of the Un interface, a Media Access Control-control element (MAC-CE, Medium Access Control-Control Elements) or sending of the RRC message. Notification performed by using the physical uplink control channel is at a fast speed, and can be completed in a subframe.

In an implementable manner, the RN further includes a switch-on module 240.

The switch-on module 240 is configured to receive a switch-on message sent by the DeNB, where the switch-on message is used to instruct to switch on the RN.

In specific implementation, when detecting that there is no signal interference, the DeNB sends the switch-on message to the RN, and the RN is switched on according to the switch-on message, and works in the unlicensed spectrum.

In an implementable manner, a manner in which the switch-on module 240 receives the switch-on message may be any one of a physical downlink control channel (E-PDCCH, Enhanced-Physical Downlink Control Channel) of the Un interface, a Medium Access Control-control element or sending of the RRC message.

By means of FIG. 2 of this embodiment of the present invention, the RN is provided, to support the data stream aggregation technology by reconfiguring the Un bearer. After the RN is added, the DeNB communicates with the UE by means of data stream aggregation, by using some user data, and by using the RN, thereby improving a throughput rate of a user in a case of ensuring business continuity. In the data stream aggregation technology, the user equipment UE may receive data from or transmit data to the DeNB and the RN at the same time, where the DeNB mainly provides functions such as mobility management, and improves business continuity of the UE in high-speed movement by using wide coverage of the DeNB, and the RN is mainly configured to undertake sending of some data, and improve a throughput rate of a user. Moreover, the RN works in the unlicensed spectrum, so as to reduce data transmission costs, and facilitate development of wireless communications technologies.

Figure 3:
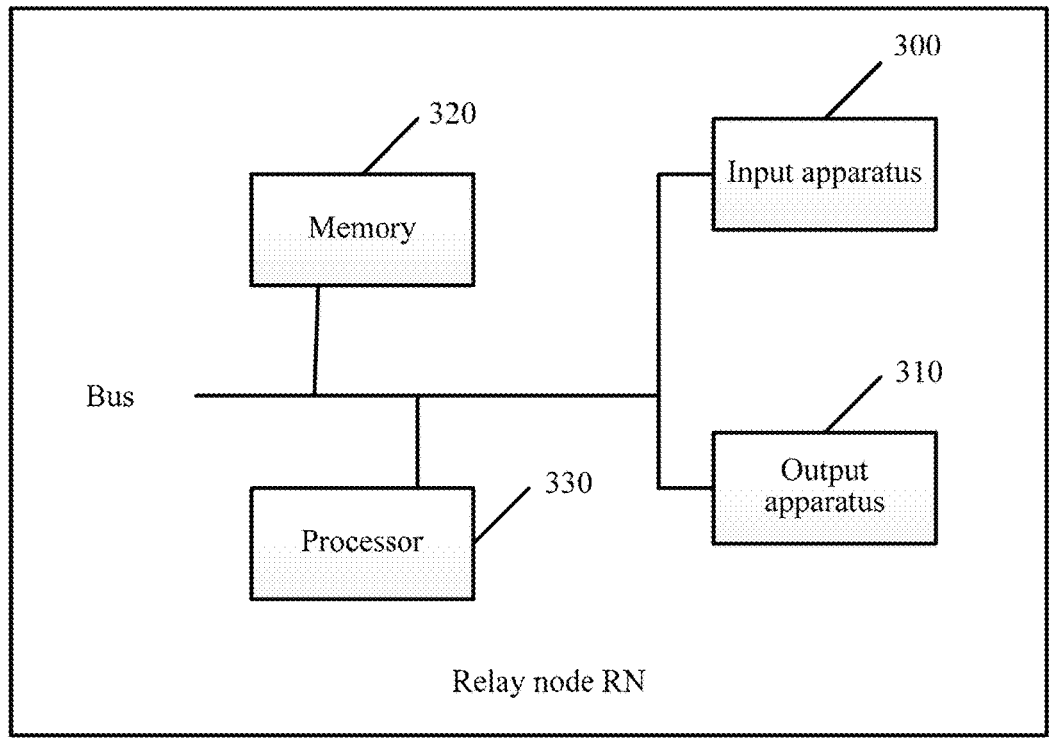
FIG. 3 is a schematic structural diagram of another embodiment of a relay node RN according to an embodiment of the present invention.

Referring to FIG. 3, FIG. 3 is a schematic structural diagram of another embodiment of a relay node RN according to an embodiment of the present invention.

The relay node RN shown in FIG. 3 includes an input apparatus 300, an output apparatus 310, a memory 320 and a processor 330 (there may be one or more processors 330 in the relay node RN, and in FIG. 3, one processor is used as an example). In this embodiment of the present invention, the input apparatus 300, the output apparatus 310, the memory 320, and the processor 330 may be connected by using a bus or in another manner, and FIG. 3 uses an example in which connection is implemented by using a bus.

In this embodiment, the processor 330 may receive, by using the input apparatus 300, an indication or signaling sent by a DeNB or another device. Likewise, the processor 330 may also send an indication or signaling to the DeNB or another device by using the output apparatus 310.

The memory 320 is configured to store a program, and the processor 330 is configured to invoke the program to execute the following steps:

sending an indication message to a donor eNodeB DeNB, where the indication message is used to indicate whether the RN supports data stream aggregation; when the DeNB determines, according to the indication message, that the RN supports data stream aggregation, receiving a request sent by the DeNB, where the request is used to request to communicate with user equipment UE by means of data stream aggregation between the RN and the DeNB; reconfiguring, by the RN, a bearer between the RN and the DeNB according to the request; and instructing the DeNB to communicate with the UE by means of the data stream aggregation between the DeNB and the RN.

In an implementable manner, the processor 330 further executes the following step:

when it is detected that signal interference is greater than a preset threshold, switching off the RN, and sending a switch-off message to the DeNB, where the switch-off message is used to instruct to switch off the RN.

In an implementable manner, the processor 330 further executes the following step:

receiving a switch-on message sent by the DeNB, where the switch-on message is used to instruct to switch on the RN.

In an implementable manner, a manner in which the processor 330 sends the switch-off message or receives the switch-on message includes any one of the following:

a physical control channel, a Medium Access Control-control element, or radio resource control signaling.

In an implementable manner, the indication message is further used to instruct the RN to work in an unlicensed spectrum.

In an implementable manner, the request that is sent by the DeNB and that is received by the processor 330 further includes a quality of service QoS parameter, where the QoS parameter is used to reconfigure a bearer between the RN and the DeNB.

The processor 330 reconfigures the bearer between the RN and the DeNB according to the request, and executes the following step:

reconfiguring the bearer between the RN and the DeNB according to the QoS parameter.

In an implementable manner, the request further includes path information of an interface between the RN and the DeNB and an identifier of the UE.

In an implementable manner, the processor 330 receives the request sent by the DeNB, and executes the following step:

receiving a radio resource control RRC message sent by the DeNB, where the RRC message includes the request.

By means of FIG. 3 of this embodiment of the present invention, the RN is provided, and includes the input apparatus 300, the output apparatus 310, the memory 320 and the processor 330, where the processor 330 supports the data stream aggregation technology by reconfiguring the Un bearer. After the RN is added, the DeNB communicates with the UE by means of data stream aggregation, by using some user data, and by using the RN, thereby improving a throughput rate of a user in a case of ensuring business continuity. In the data stream aggregation technology, the user equipment UE may receive data from or transmit data to the DeNB and the RN at the same time. Moreover, the RN works in the unlicensed spectrum, so as to reduce data transmission costs, and facilitate development of wireless communications technologies.

Figure 4:
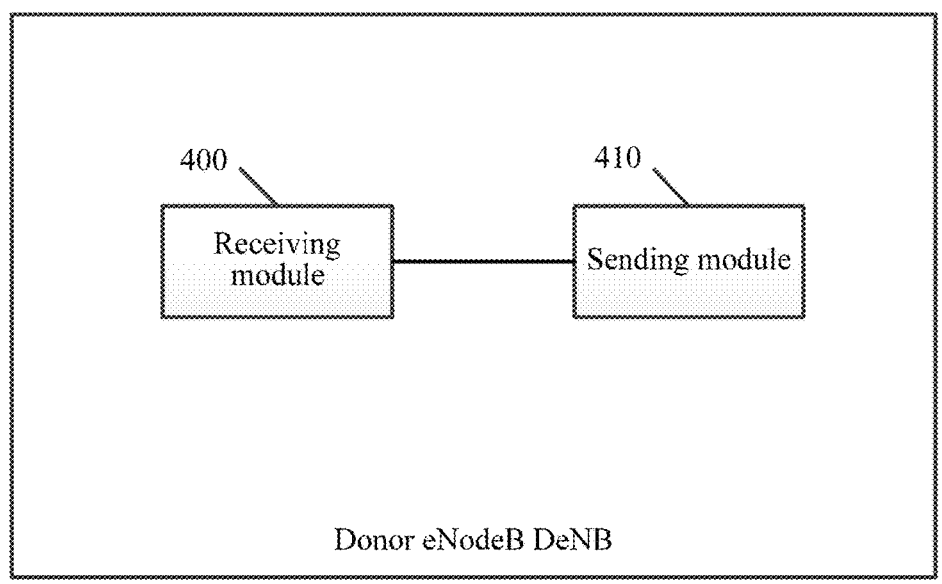
FIG. 4 is a schematic structural diagram of an embodiment of a donor eNodeB DeNB according to an embodiment of the present invention.

Referring to FIG. 4, FIG. 4 is a schematic structural diagram of an embodiment of a donor eNodeB DeNB according to an embodiment of the present invention. The DeNB involved in this embodiment of the present invention is associated with a secondary eNodeB mainly in a data stream aggregation scenario. An RN involved in this embodiment of the present invention may be used as a secondary eNodeB of the DeNB, and be directly connected to the DeNB by using a wireless interface. The DeNB performs data transmission by using a data stream aggregation technology, and in the data stream aggregation technology, the DeNB does not need to establish an S1 interface with the RN. In this embodiment of the present invention, an MSA technology continues to be exemplified.

UE involved in this embodiment of the present invention may be a mobile terminal, a personal digital assistant or another mobile electronic communications device that supports data stream aggregation. The UE needs to have a radio access network service request capability, and may be operated in a wide-area cellular network frequency band, or may be operated in a radio access network frequency band (such as a GAN frequency band and/or a UMA frequency band).

The DeNB involved in this embodiment of the present invention includes a receiving module 400 and a sending module 410.

The receiving module 400 is configured to receive an indication message sent by a relay node RN, where the indication message is used to indicate whether the RN supports data stream aggregation.

In an initial state, the DeNB receives the indication message sent by the RN, where the indication message is used to indicate whether the RN supports the MSA technology. If the indication message is transmitted by using a Un interface, an RRC connection needs to be established. In this case, the indication message may be an RRC message.

In an implementable manner, the DeNB further provides a routing relay function of an X2 interface, and if the indication message is transmitted by using the X2 interface (an eNB ID of the RN is the same as that of the DeNB, and therefore the RN also has some interfaces of the DeNB, such as the X2 interface), an X2 message may be re-defined. By contrast, because the Un interface is an air interface, the Un interface is less limited to a region, has wider coverage and has a quicker transmission speed.

In an implementable manner, the indication message received by the receiving module 400 is further used to instruct the RN to work in an unlicensed spectrum.

The sending module 410 is configured to: when it is determined according to the indication message that the RN supports data stream aggregation, send a request to the RN, where the request is used to request to communicate with user equipment UE by means of data stream aggregation between the DeNB and the RN.

In specific implementation, when the DeNB determines according to the received indication message that the RN supports the MSA technology, if an RRC connection is established between the DeNB and the RN, the DeNB sends a request to the RN, where the request is used to communicate with the user equipment UE by using the MSA technology between the RN and the DeNB.

In an implementable manner, the request sent by the DeNB may be an RRC message.

In an implementable manner, the request sent by the sending module 410 to the RN further includes a quality of service QoS parameter, where the QoS parameter is set by the DeNB according to a QoS requirement for configuring data stream aggregation, and is used to reconfigure a bearer between the DeNB and the RN. The QoS requirement may specifically refer to a bandwidth of the Un interface, and to satisfy MSA, the bandwidth of the Un interface therefore needs to be adjusted and enlarged. By modifying the QoS parameter, the bandwidth of the Un interface can be adjusted and enlarged, thereby ensuring that an important traffic volume is not delayed or discarded when a network is overloaded or congested, and ensuring efficient running of the network.

In an implementable manner, the request further includes path information of an interface between the DeNB and the RN and an identifier of the UE. The path information is used to indicate a path of transfer from the RN to an interface of the DeNB, and is also used to indicate a path of transfer from the RN to an interface of the UE. Information about the identifier of the UE may be a context of the UE, where the context of the UE includes a network capability of the UE, an ID of the DeNB, authentication information, a generated key, information about a created connection, bearer information and the like.

In an implementable manner, the sending module 410 is specifically configured to send a radio resource control RRC message to the RN, where the RRC message includes the request. The request may be further encapsulated into an encapsulation packet, which is carried by the RRC message, and carrying by using RRC message can ensure that the QoS parameter of the Un bearer meets a requirement of satisfying MSA, and can reduce increase in the time delay of the RN, thereby sharing a load of the user data by means of the data stream aggregation technology. Because the Un interface is an air interface, the Un interface is less limited to a region, and has wider coverage and a quicker transmission speed. Generally, the DeNB and the RN communicate with each other by using the Un interface.

The receiving module 400 is further configured to receive an indication of the RN, so as to communicate with the UE by means of the data stream aggregation between the DeNB and the RN.

In specific implementation, after the RN reconfigures the Un bearer according to the QoS parameter, the RN instructs the DeNB to communicate with the UE by using the MSA.

In an implementable manner, the indication message for determining modification that is received by the receiving module 400 not only may be a new RRC message, but also may be encapsulated into an encapsulation packet, which is carried by the RRC message.

The receiving module 400 is further configured to: when the RN detects that signal interference is greater than a preset threshold, receive a switch-off message sent by the RN, where the switch-off message is used to instruct to switch off the RN.

In specific implementation, when the RN working in the unlicensed spectrum detects signal interference, that is, detects interference generated by WiFi or detects that a radar signal is greater than a preset threshold value, the RN may be rapidly switched off according to an interference situation, the RN is entirely switched off, and the DeNB receives a switch-off state that is fed back by the RN by using the Un interface.

In an implementable manner, a manner in which the receiving module 400 receives the switch-off message may be any one of a physical uplink control channel of the Un interface, a Medium Access Control-control element or sending of the RRC message.

The sending module 410 is further configured to send a switch-on message to the RN, where the switch-on message is used to instruct to switch on the RN.

In specific implementation, when detecting that there is no signal interference, the DeNB sends the switch-on message to the RN, and the RN is switched on according to the switch-on message, and then works in the unlicensed spectrum.

In an implementable manner, a manner in which the sending module 410 sends the switch-on message may be any one of a physical downlink control channel of the Un interface, a Medium Access Control-control element or sending of the RRC message.

By means of FIG. 4 of this embodiment of the present invention, the DeNB is provided, to support the data stream aggregation technology by setting the QoS parameter to enable the RN to reconfigure the Un bearer. After the RN is added, the DeNB communicates with the UE by means of data stream aggregation, by using some user data, and by using the RN, thereby improving a throughput rate of a user in a case of ensuring business continuity. The DeNB mainly provides functions such as mobility management, and improves business continuity of the UE in high-speed movement by using wide coverage of the DeNB, and the RN is mainly configured to undertake sending of some data, and improve a throughput rate of a user.

Figure 5:
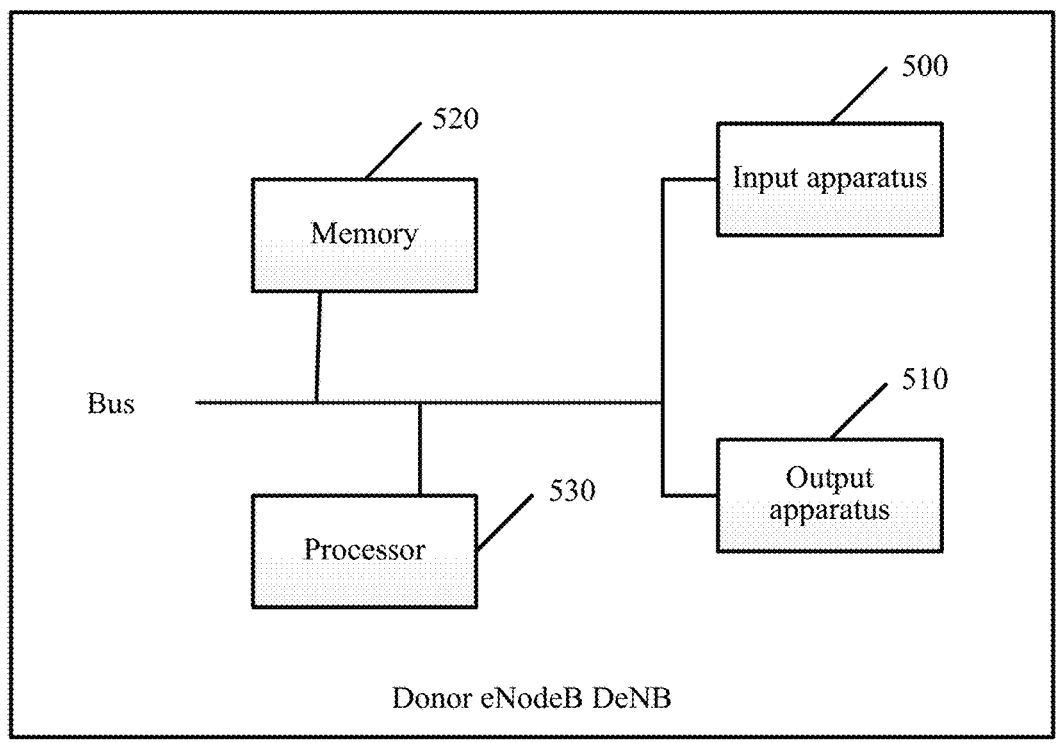
FIG. 5 is a schematic structural diagram of another embodiment of a donor eNodeB DeNB according to an embodiment of the present invention.

Referring to FIG. 5, FIG. 5 is a schematic structural diagram of another embodiment of a donor eNodeB DeNB according to an embodiment of the present invention.

The donor eNodeB DeNB shown in FIG. 5 includes an input apparatus 500, an output apparatus 510, a memory 520 and a processor 530 (there may be one or more processors 530 in the relay node RN, and in FIG. 5, one processor is used as an example). In this embodiment of the present invention, the input apparatus 500, the output apparatus 510, the memory 520, and the processor 530 may be connected by using a bus or in another manner, and FIG. 5 uses an example in which connection is implemented by using a bus.

In this embodiment, the processor 530 may receive, by using the input apparatus 500, an indication or signaling sent by a DeNB or another device. Likewise, the processor 530 may also send an indication or signaling to the DeNB or another device by using the output apparatus 510.

The memory 520 is configured to store a program, and the processor 530 is configured to invoke the program to execute the following steps:

receiving an indication message sent by a relay node RN, where the indication message is used to indicate whether the RN supports data stream aggregation; when it is determined according to the indication message that the RN supports data stream aggregation, sending a request to the RN, where the request is used to request to communicate with user equipment UE by means of data stream aggregation between the DeNB and the RN; and receiving an indication of the RN, so as to communicate with the UE by means of the data stream aggregation between the DeNB and the RN.

In an implementable manner, the processor 530 further executes the following step:

when the RN detects that signal interference is greater than a preset threshold, receiving a switch-off message sent by the RN, where the switch-off message is used to instruct to switch off the RN.

In an implementable manner, the processor 530 further executes the following step:

sending a switch-on message to the RN, where the switch-on message is used to instruct to switch on the RN.

In an implementable manner, a manner in which the processor 530 receives the switch-off message or sends the switch-on message includes any one of the following:

a physical control channel, a Medium Access Control-control element, or radio resource control signaling.

In an implementable manner, the indication message received by the processor 530 is further used to instruct the RN to work in an unlicensed spectrum.

In an implementable manner, the request sent by the processor 530 to the RN further includes a quality of service QoS parameter, where the QoS parameter is set by the processor 530 according to a QoS requirement for configuring data stream aggregation, and is used to reconfigure a bearer between the DeNB and the RN.

In an implementable manner, the request further includes path information of an interface between the DeNB and the RN and an identifier of the UE.

In an implementable manner, the processor 530 sends the request to the RN, and executes the following step:

sending a radio resource control RRC message to the RN, where the RRC message includes the request.

By means of FIG. 5 of this embodiment of the present invention, the DeNB is provided, and includes the input apparatus 500, the output apparatus 510, the memory 520 and the processor 530, where the processor 530 supports the data stream aggregation technology by setting the QoS parameter to enable the RN to reconfigure the Un bearer. After the RN is added, the DeNB communicates with the UE by means of data stream aggregation, by using some user data, and by using the RN, thereby improving a throughput rate of a user in a case of ensuring business continuity.

Figure 6:
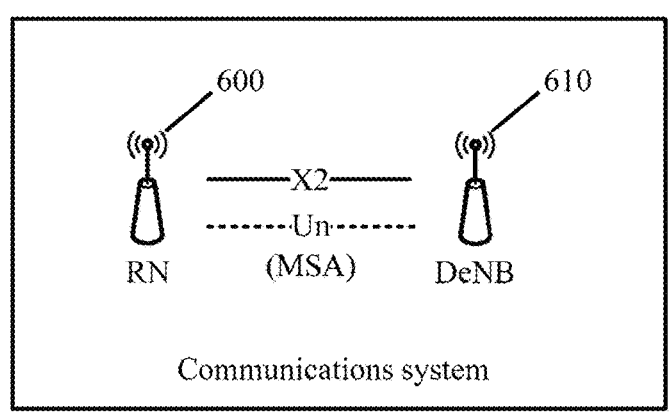
FIG. 6 is a schematic structural diagram of a communications system according to an embodiment of the present invention.

Referring to FIG. 6, FIG. 6 is a schematic structural diagram of a communications system according to an embodiment of the present invention. The communications system shown in FIG. 6 includes a relay node RN 600 and a donor eNodeB DeNB 610, where a dashed line between the RN 600 and the DeNB 610 denotes a connection established by using a Un interface, and a solid line between the RN 600 and the DeNB 610 denotes a connection established by using an X2 interface. A structure of the RN 600 may be the same as a structure of the RN shown in FIG. 2 and FIG. 3, a structure of the DeNB 610 may be the same as a structure of the DeNB shown in FIG. 4 and FIG. 5, and details are not described in this embodiment of the present invention.

The RN 600 is configured to send an indication message to the DeNB 610, where the indication message is used to indicate whether the RN 600 supports data stream aggregation; when the DeNB 610 determines according to the indication message that the RN 600 supports data stream aggregation, receive a request sent by the DeNB 610, where the request is used to request to communicate with user equipment UE by means of data stream aggregation between the RN 600 and the DeNB 610; reconfigure a bearer between the RN 600 and the DeNB 610 according to the request; and instruct the DeNB 610 to communicate with the UE by means of the data stream aggregation between the DeNB 610 and the RN 600.

The DeNB 610 is configured to receive the indication message sent by the RN 600, where the indication message is used to indicate whether the RN 600 supports data stream aggregation; when it is determined according to the indication message that the RN 600 supports data stream aggregation, send a request to the RN 600, where the request is used to request to communicate with the user equipment UE by means of the data stream aggregation between the DeNB 610 and the RN 600; and receive an indication of the RN 600, so as to communicate with the UE by means of the data stream aggregation between the DeNB 610 and the RN 600.

In an implementable manner, when the RN 600 detects that signal interference is greater than a preset threshold, the RN 600 is switched off, and a switch-off message is sent to the DeNB 610, where the switch-off message is used to instruct to switch off the RN 600.

In an implementable manner, the RN 600 receives a switch-on message sent by the DeNB 610, where the switch-on message is used to instruct to switch on the RN 600.

In an implementable manner, a manner in which the RN 600 sends the switch-off message or receives the switch-on message includes any one of the following: a physical control channel, a Medium Access Control-control element, or radio resource control signaling. For details of a specific step in which the RN 600 sends the switch-off message or receives the switch-on message, refer to description parts of the switch-off module and the switch-on module in FIG. 2 of the embodiment, and details are not described in this embodiment.

In an implementable manner, the indication message is further used to instruct the RN 600 to work in an unlicensed spectrum.

In an implementable manner, the request that of the DeNB 610 and that is received by the RN 600 further includes a quality of service QoS parameter, where the QoS parameter is used to reconfigure a bearer between the RN 600 and the DeNB 610. For details of specific implementation of the QoS parameter, refer to a description part of the receiving module of the RN 600 in FIG. 2 of the embodiment, and details are not described in this embodiment.

In an implementable manner, the RN 600 reconfigures the bearer between the RN 600 and the DeNB 610 according to the QoS parameter. For details of specific implementation of reconfiguration of the bearer, refer to a description part of the configuration module of the RN 600 in FIG. 2 of the embodiment, and details are not described in this embodiment.

In an implementable manner, the request further includes path information of an interface between the RN 600 and the DeNB 610 and an identifier of the UE.

In an implementable manner, the RN 600 receives a radio resource control RRC message sent by the DeNB 610, where the RRC message includes the request.

In an implementable manner, when the RN 600 detects that signal interference is greater than a preset threshold, the DeNB 610 receives a switch-off message sent by the RN 600, where the switch-off message is used to instruct to switch off the RN 600.

In an implementable manner, the DeNB 610 sends a switch-on message to the RN 600, where the switch-on message is used to instruct to switch on the RN 600. For details of a specific step in which the DeNB 610 receives the switch-off message or sends the switch-on message, refer to description parts of the receiving module and the sending module in FIG. 4 of the embodiment, and details are not described in this embodiment.

In an implementable manner, a manner in which the DeNB 610 receives the switch-off message or sends the switch-on message includes any one of the following: a physical control channel, a Medium Access Control-control element, or radio resource control signaling.

In an implementable manner, the request sent by the DeNB 610 to the RN 600 includes a quality of service QoS parameter, where the QoS parameter is set by the DeNB 610 according to a QoS requirement for configuring data stream aggregation, and is used to reconfigure a bearer between the DeNB 610 and the RN 600. For details of a part in which the DeNB 610 sets the QoS parameter, refer to FIG. 4 of the embodiment, and details are not described in this embodiment.

In an implementable manner, the DeNB 610 sends a radio resource control RRC message to the RN 600, where the RRC message includes the request.

By means of FIG. 6 of this embodiment of the present invention, the RN can support the data stream aggregation technology by reconfiguring the Un bearer. After the RN is added, the DeNB communicates with the UE by means of data stream aggregation, by using some user data, and by using the RN, thereby improving a throughput rate of a user in a case of ensuring business continuity. In the data stream aggregation technology, the user equipment UE may receive data from or transmit data to the DeNB and the RN at the same time, where the DeNB mainly provides functions such as mobility management, and improves business continuity of the UE in high-speed movement by using wide coverage of the DeNB, and the RN node is mainly configured to undertake sending of data, and improve a throughput rate of a user.

Figure 7:
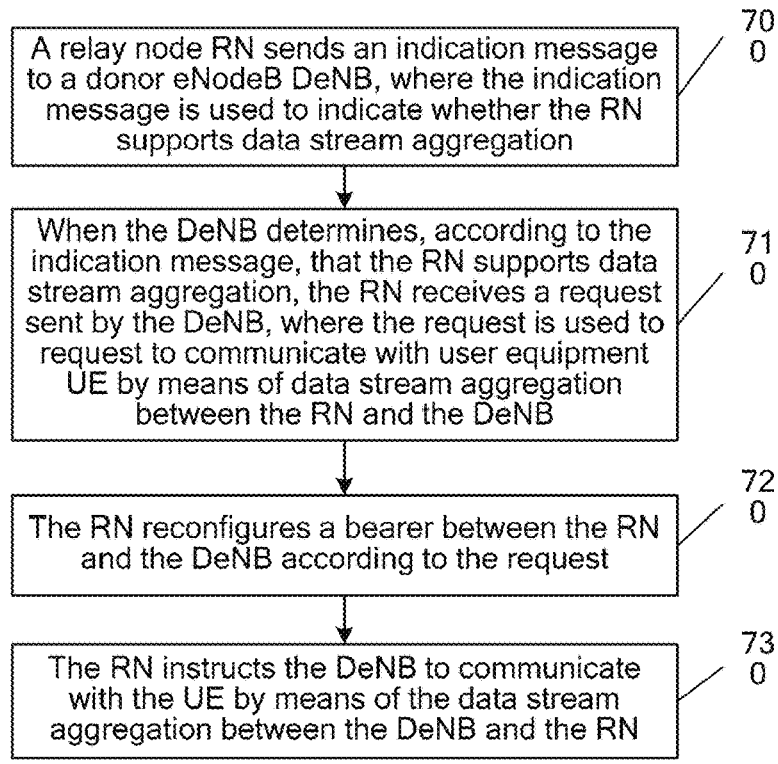
FIG. 7 is a schematic flowchart of a communication method according to an embodiment of the present invention.

Referring to FIG. 7, FIG. 7 is a schematic flowchart of a communication method according to an embodiment of the present invention. An RN involved in this embodiment of the present invention may be used as a secondary eNodeB of a DeNB, and be directly connected to the DeNB by using a wireless interface. For example, the foregoing RN may work in an unlicensed spectrum, and perform data transmission by using a data stream aggregation technology. In the data stream aggregation technology, the RN does not need to establish an S1 interface with the DeNB, that is, does not need to be connected to a core network by using the S1 interface and by means of the DeNB. In this embodiment of the present invention, an MSA technology continues to be exemplified.

UE involved in this embodiment of the present invention may be a mobile terminal, a personal digital assistant or another mobile electronic communications device that supports data stream aggregation. The UE needs to have a radio access network service request capability, and may be operated in a wide-area cellular network frequency band, or may be operated in a radio access network frequency band (such as a GAN frequency band and/or a UMA frequency band).

As shown in FIG. 7, the communication method of this embodiment of the present invention may include the following steps:

700: A relay node RN sends an indication message to a donor eNodeB DeNB, where the indication message is used to indicate whether the RN supports data stream aggregation.

710: When the DeNB determines, according to the indication message, that the RN supports data stream aggregation, the RN receives a request sent by the DeNB, where the request is used to request to communicate with user equipment UE by means of data stream aggregation between the RN and the DeNB.

720: The RN reconfigures a bearer between the RN and the DeNB according to the request.

730: The RN instructs the DeNB to communicate with the UE by means of the data stream aggregation between the DeNB and the RN.

In specific implementation, the RN sends the indication message to the DeNB, where the indication message is used to indicate whether the RN supports an MSA technology. If the indication message is transmitted by using a Un interface, an RRC connection needs to be established. In this case, the indication message may be an RRC message. If the indication message is transmitted by using an X2 interface, an X2 message may be re-defined.

In an implementable manner, the indication message is further used to instruct the RN to support working in an unlicensed spectrum.

In specific implementation, when the DeNB determines according to the received indication message that the RN supports the MSA technology, if an RRC connection is established between the DeNB and the RN, the DeNB sends a request to the RN, where the request is used to communicate with the user equipment UE by using the MSA technology between the RN and the DeNB.

In an implementable manner, the request received by the RN may be an RRC message.

In an implementable manner, before the DeNB sends the request to the RN, the DeNB sets a QoS parameter of a Un bearer according to a QoS requirement for configuring data stream aggregation. Modification on the QoS parameter of the Un bearer can configure data stream aggregation for the RN to satisfy requirements of a service such as a rate and a time delay, and therefore the DeNB needs to set the QoS parameter of the Un bearer according to a situation of data offloaded to the RN.

In an implementable manner, after the DeNB modifies the QoS parameter, if an RRC connection is established between the DeNB and the RN, the DeNB sends the request to the RN. The request includes the QoS parameter, path information of an interface between the RN and the DeNB and an identifier of the UE. The request may be further encapsulated into an encapsulation packet, which is carried by the RRC message, and carrying by using RRC message can ensure that the QoS parameter of the Un bearer meets a requirement of satisfying MSA, and reduce increase in the time delay of the RN, thereby sharing a load of the user data by using the MSA technology.

In specific implementation, after receiving the request sent by the DeNB, the RN performs corresponding modification on a related parameter of the Un bearer, so that the bandwidth of the Un bearer can support the MSA technology, and communication with the user equipment UE is performed by means of the data stream aggregation between the RN and the DeNB.

In specific implementation, after the RN reconfigures the Un bearer according to the QoS parameter, the RN instructs the DeNB to communicate with the UE by using the MSA.

In an implementable manner, the RN may send, to the DeNB, the indication message for determining modification, where the indication message not only may be a new RRC message, but also may be encapsulated into an encapsulation packet, which is carried by the RRC message. After the RN is added, the DeNB communicates with the UE by using MSA, by using some user data, and by using the RN.

Optionally, when the RN detects that signal interference is greater than a preset threshold, the RN is switched off, and a switch-off message is sent to the DeNB, where the switch-off message is used to instruct to switch off the RN.

In specific implementation, when the RN working in the unlicensed spectrum detects signal interference, that is, detects interference generated by WiFi or detects that a radar signal is greater than a preset threshold value, the RN may be rapidly switched off according to an interference situation, and the RN is entirely switched off, and feeds back a switch-off state of the RN to the DeNB by using the Un interface.

In an implementable manner, a manner in which the RN sends the switch-off message may be any one of a physical uplink control channel of the Un interface, a Medium Access Control-control element or sending of the RRC message. Notification performed by using the physical uplink control channel is at a fast speed, and can be completed in a subframe.

Optionally, the RN receives a switch-on message sent by the DeNB, where the switch-on message is used to instruct to switch on the RN.

In specific implementation, when detecting that there is no signal interference, the DeNB sends the switch-on message to the RN, and the RN is switched on according to the switch-on message, and then works in the unlicensed spectrum.

In an implementable manner, a manner in which the RN receives the switch-on message may be any one of a physical downlink control channel of the Un interface, a Medium Access Control-control element or sending of the RRC message.

By means of FIG. 7 of this embodiment of the present invention, the RN is provided, to support the data stream aggregation technology by reconfiguring the Un bearer. After the RN is added, the DeNB communicates with the UE by means of data stream aggregation, by using some user data, and by using the RN, thereby improving a throughput rate of a user in a case of ensuring business continuity. In the data stream aggregation technology, the user equipment UE may receive data from or transmit data to the DeNB and the RN at the same time, where the DeNB mainly provides functions such as mobility management, and improves business continuity of the UE in high-speed movement by using wide coverage of the DeNB, and the RN is mainly configured to undertake sending of some data, and improve a throughput rate of a user. Moreover, the RN works in the unlicensed spectrum, so as to reduce data transmission costs, and facilitate development of wireless communications technologies.

Figure 8:
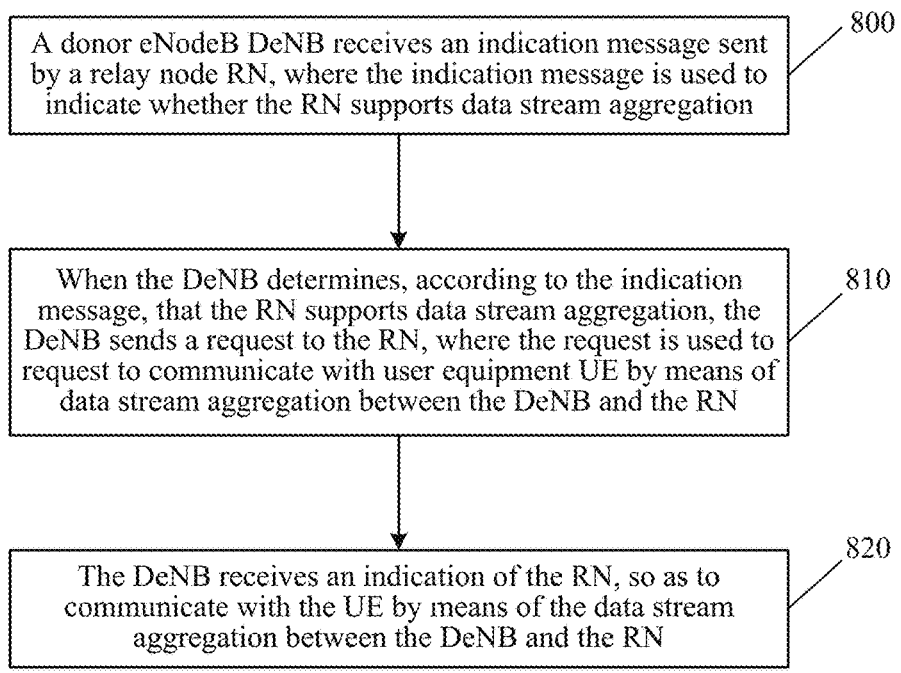
FIG. 8 is a schematic flowchart of another communication method according to an embodiment of the present invention.

Referring to FIG. 8, FIG. 8 is a schematic flowchart of another communication method according to an embodiment of the present invention. A DeNB involved in this embodiment of the present invention is associated with a secondary eNodeB mainly in a data stream aggregation scenario. An RN involved in this embodiment of the present invention may be used as a secondary eNodeB of the DeNB, and be directly connected to the DeNB by using a wireless interface. The DeNB performs data transmission by using a data stream aggregation technology, and in the data stream aggregation technology, the DeNB does not need to establish an S1 interface with the RN. In this embodiment of the present invention, an MSA technology continues to be exemplified.

In an implementable manner, in this embodiment of the present invention, a mobility management entity MME of a core network is added, where the MME is mainly configured to control the DeNB to send an RN addition request to the RN, and the MME and the DeNB communicate with each other still by using the S1 interface.

In an implementable manner, the DeNB can further communicate with UE, so as to inform the UE of an RN addition operation, so that the UE can communicate with the RN.

As shown in FIG. 8, the another communication method of this embodiment of the present invention may include the following steps:

800: A donor eNodeB DeNB receives an indication message sent by a relay node RN, where the indication message is used to indicate whether the RN supports data stream aggregation.

810: When the DeNB determines, according to the indication message, that the RN supports data stream aggregation, the DeNB sends a request to the RN, where the request is used to request to communicate with user equipment UE by means of data stream aggregation between the DeNB and the RN.

820: The DeNB receives an indication of the RN, so as to communicate with the UE by means of the data stream aggregation between the DeNB and the RN.

In specific implementation, the DeNB receives the indication message sent by the RN, where the indication message is used to indicate whether the RN supports an MSA technology. If the indication message is received by using a Un interface, an RRC connection needs to be established. In this case, the indication message may be an RRC message. If the indication message is received by using an X2 interface, an X2 message may be re-defined.

In an implementable manner, the indication message is further used to instruct the RN to support working in an unlicensed spectrum.

In specific implementation, when the DeNB determines according to the received indication message that the RN supports the MSA technology, if an RRC connection is established between the DeNB and the RN, the DeNB sends a request to the RN, where the request is used to communicate with the user equipment UE by using the MSA technology between the RN and the DeNB.

In an implementable manner, the request sent by the DeNB may be an RRC message.

In an implementable manner, before the DeNB sends the request to the RN, the DeNB sets a QoS parameter of a Un bearer according to a QoS requirement for configuring data stream aggregation. Modification on the QoS parameter of the Un bearer can configure data stream aggregation for the RN to satisfy requirements of a service such as a rate and a time delay, and therefore the DeNB needs to set the QoS parameter of the Un bearer according to a situation of data offloaded to the RN.

In an implementable manner, after setting the QoS parameter of the Un bearer, the DeNB establishes a radio access bearer connection to the MME by using an application protocol of an S1 interface, and sends a request message (Create/Update Bearer Request) for reconfiguring the Un bearer to the MME, so as to inform the MME of the RN addition operation. After being informed, the MME returns a reconfiguration bearer message by using the application protocol of the S1 interface.

In an implementable manner, after the DeNB receives the message returned by the MME, if an RRC connection is established between the DeNB and the RN, the DeNB sends the request to the RN. The request further includes path information of an interface between the RN and the DeNB and an identifier of the UE. The request may be further encapsulated into an encapsulation packet, which is carried by the RRC message, and carrying by using RRC message can ensure that the QoS parameter of the Un bearer meets a requirement of satisfying MSA, and reduce increase in the time delay of the RN, thereby sharing a load of the user data by using the MSA technology.

In an implementable manner, after sending the request to the RN, the DeNB may further feed back, to the MME by using the application protocol of the S1 interface, an operation of implementing sending of the RN addition request.

In specific implementation, after receiving the request sent by the DeNB, the RN performs corresponding modification on a related parameter of the Un bearer, so that the bandwidth of the Un bearer can support the MSA technology. After the RN reconfigures the Un bearer according to the QoS parameter, the RN instructs the DeNB to communicate with the UE by using the MSA.

In an implementable manner, the RN may send, to the DeNB, the indication message for determining modification, where the indication message not only may be a new RRC message, but also may be encapsulated into an encapsulation packet, which is carried by the RRC message.

In an implementable manner, after the RN sends the indication message for determining modification to the DeNB, the DeNB sends, to the MME, a message for determining that the Un bearer is modified successfully.

In an implementable manner, the DeNB may prompt by using a Uu interface that an RN is already added to the user equipment UE.

In an implementable manner, the DeNB delivers an RRC message to the UE by using the Uu interface, so as to prompt that an RN is already added to the user equipment UE. An eNB ID of the RN is the same as that of the DeNB, and therefore the RRC message includes an indication of the RN node, where the indication is used to indicate that the RN supports the MSA technology, so as to avoid error occurrence when the UE configures the RN. After the RN is added, the DeNB communicates with the UE by using MSA, by using some user data, and by using the RN.

Optionally, when the RN detects that signal interference is greater than a preset threshold, the DeNB receives a switch-off message sent by the RN, where the switch-off message is used to instruct to switch off the RN.

In specific implementation, when the RN working in the unlicensed spectrum detects signal interference, that is, detects interference generated by WiFi or detects that a radar signal is greater than a preset threshold value, the RN may be rapidly switched off according to an interference situation, and the RN is entirely switched off, and feeds back a switch-off state of the RN to the DeNB by using the Un interface.

In an implementable manner, a manner in which the RN sends the switch-off message may be any one of a physical uplink control channel of the Un interface, a Medium Access Control-control element or sending of the RRC message. Notification performed by using the physical uplink control channel is at a fast speed, and can be completed in a subframe.

Optionally, the DeNB sends a switch-on message to the RN, where the switch-on message is used to instruct to switch on the RN.

In specific implementation, when detecting that there is no signal interference, the DeNB sends the switch-on message to the RN, and the RN is switched on according to the switch-on message, and then works in the unlicensed spectrum.

In an implementable manner, a manner in which the RN receives the switch-on message may be any one of a physical downlink control channel of the Un interface, a Medium Access Control-control element or sending of the RRC message.

By means of FIG. 8 of this embodiment of the present invention, the DeNB is provided, to support the data stream aggregation technology by setting the QoS parameter to enable the RN to reconfigure the Un bearer. After the RN is added, the DeNB communicates with the UE by means of data stream aggregation, by using some user data, and by using the RN, thereby improving a throughput rate of a user in a case of ensuring business continuity. The DeNB mainly provides functions such as mobility management, and improves business continuity of the UE in high-speed movement by using wide coverage of the DeNB, and the RN is mainly configured to undertake sending of some data, and improve a throughput rate of a user.

It should be noted that, for brief description, the foregoing method embodiments are represented as a series of actions. However, a person skilled in the art should appreciate that the present application is not limited to the described order of the actions, because according to the present application, some steps may be executed in other orders or simultaneously. It should be further appreciated by a person skilled in the art that the embodiments described in this specification all belong to exemplary embodiments, and the involved actions and modules are not necessarily required by the present application.

In the foregoing embodiments, the description of each embodiment has respective focuses. For a part that is not described in detail in an embodiment, reference may be made to related descriptions in other embodiments.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include: a magnetic disk, an optical disc, a read-only memory (Read-Only Memory, ROM), a random access memory (Random Access Memory, RAM), or the like.

What is disclosed above is merely exemplary embodiments of the present invention, and certainly is not intended to limit the protection scope of the present invention. Therefore, equivalent variations made in accordance with the claims of the present invention shall fall within the scope of the present invention.

What is claimed is:

1. A relay node RN, wherein the RN comprises an input apparatus, an output apparatus, a memory and a processor, wherein
the memory is configured to store a program, and the processor is configured to invoke the program to execute the following steps:
sending an indication message to a donor eNodeB DeNB by using the output apparatus, wherein the indication message is used to indicate whether the RN supports data stream aggregation;
when the DeNB determines, according to the indication message, that the RN supports data stream aggregation, receiving, by using the input apparatus, a request sent by the DeNB, wherein the request is used to request to communicate with user equipment UE by means of data stream aggregation between the RN and the DeNB;
reconfiguring a bearer between the RN and the DeNB according to the request; and
instructing, by using the output apparatus, the DeNB to communicate with the UE by means of the data stream aggregation between the DeNB and the RN.

2. The RN according to claim 1, wherein
the processor further executes the following step:
when it is detected that signal interference is greater than a preset threshold, switching off the RN, and sending a switch-off message to the DeNB by using the output apparatus, wherein the switch-off message is used to instruct to switch off the RN.

3. The RN according to claim 2, wherein
the processor further executes the following step:
receiving, by using the input apparatus, a switch-on message sent by the DeNB, wherein the switch-on message is used to instruct to switch on the RN.

4. The RN according to claim 3, wherein the indication message is further used to instruct the RN to work in an unlicensed spectrum.

5. The RN according to claim 3, wherein
the request that is sent by the DeNB and that is received by the processor by using the input apparatus further comprises:
a quality of service QoS parameter, wherein the QoS parameter is used to reconfigure the bearer between the RN and the DeNB; and
the processor reconfigures the bearer between the RN and the DeNB according to the request, and executes the following step:
reconfiguring the bearer between the RN and the DeNB according to the QoS parameter.

6. A donor eNodeB DeNB, wherein the DeNB comprises an input apparatus, an output apparatus, a memory and a processor, wherein
the memory is configured to store a program, and the processor is configured to invoke the program to execute the following steps:
receiving, by using the input apparatus, an indication message sent by a relay node RN, wherein the indication message is used to indicate whether the RN supports data stream aggregation;
when it is determined according to the indication message that the RN supports data stream aggregation, sending a request to the RN by using the output apparatus, wherein the request is used to request to communicate with user equipment UE by means of data stream aggregation between the DeNB and the RN; and
receiving an indication of the RN by using the input apparatus, so as to communicate with the UE by means of the data stream aggregation between the DeNB and the RN.

7. The DeNB according to claim 6, wherein
the processor further executes the following step:
when the RN detects that signal interference is greater than a preset threshold, receiving, by using the input apparatus, a switch-off message sent by the RN, wherein the switch-off message is used to instruct to switch off the RN.

8. The DeNB according to claim 7, wherein
the processor further executes the following step:
sending a switch-on message to the RN by using the output apparatus, wherein the switch-on message is used to instruct to switch on the RN.

9. The DeNB according to claim 8, wherein the indication message received by the processor is further used to instruct the RN to work in an unlicensed spectrum.

10. The DeNB according to claim 9, wherein
the request that is sent by the processor to the RN by using the output apparatus further comprises:
a quality of service QoS parameter, wherein the QoS parameter is set by the processor according to a QoS requirement for configuring data stream aggregation, and is used to reconfigure a bearer between the DeNB and the RN.

11. A communication method, comprising:
sending, by a relay node RN, an indication message to a donor eNodeB DeNB, wherein the indication message is used to indicate whether the RN supports data stream aggregation;
when the DeNB determines, according to the indication message, that the RN supports data stream aggregation, receiving, by the RN, a request sent by the DeNB, wherein the request is used to request to communicate with user equipment UE by means of data stream aggregation between the RN and the DeNB;
reconfiguring, by the RN, a bearer between the RN and the DeNB according to the request; and
instructing, by the RN, the DeNB to communicate with the UE by means of the data stream aggregation between the DeNB and the RN.

12. The method according to claim 11, wherein the method further comprises:
when the RN detects that signal interference is greater than a preset threshold, switching off the RN, and sending a switch-off message to the DeNB, wherein the switch-off message is used to instruct to switch off the RN.

13. The method according to claim 12, wherein the method further comprises:
receiving, by the RN, a switch-on message sent by the DeNB, wherein the switch-on message is used to instruct to switch on the RN.

14. The method according to claim 13, wherein the indication message is further used to instruct the RN to work in an unlicensed spectrum.

15. The method according to claim 14, wherein
the request that is sent by the DeNB and that is received by the RN further comprises:
a quality of service QoS parameter, wherein the QoS parameter is used to reconfigure the bearer between the RN and the DeNB; and
the reconfiguring, by the RN, a bearer between the RN and the DeNB according to the request specifically comprises:
reconfiguring, by the RN, the bearer between the RN and the DeNB according to the QoS parameter.

16. A communication method, comprising:
receiving, by a donor eNodeB DeNB, an indication message sent by a relay node RN, wherein the indication message is used to indicate whether the RN supports data stream aggregation;
when the DeNB determines, according to the indication message, that the RN supports data stream aggregation, sending, by the DeNB, a request to the RN, wherein the request is used to request to communicate with user equipment UE by means of data stream aggregation between the DeNB and the RN; and
receiving, by the DeNB, an indication of the RN, so as to communicate with the UE by means of the data stream aggregation between the DeNB and the RN.

17. The method according to claim 16, wherein the method further comprises:
when the RN detects that signal interference is greater than a preset threshold, receiving, by the DeNB, a switch-off message sent by the RN, wherein the switch-off message is used to instruct to switch off the RN.

18. The method according to claim 17, wherein the method further comprises:
sending, by the DeNB, a switch-on message to the RN, wherein the switch-on message is used to instruct to switch on the RN.

19. The method according to claim 18, wherein the indication message received by the DeNB is further used to instruct the RN to work in an unlicensed spectrum.

20. The method according to claim 19, wherein the request sent by the DeNB to the RN further comprises:
a quality of service QoS parameter, wherein the QoS parameter is set by the DeNB according to a QoS requirement for configuring data stream aggregation, and is used to reconfigure a bearer between the DeNB and the RN.

* * * * *

UNITED STATES PATENT AND TRADEMARK OFFICE
CERTIFICATE OF CORRECTION

PATENT NO. : 10,349,459 B2  
APPLICATION NO. : 15/257600  
DATED : July 9, 2019  
INVENTOR(S) : Dai et al.

Page 1 of 1

It is certified that error appears in the above-identified patent and that said Letters Patent is hereby corrected as shown below:

On the Title Page

Page 2, item (56) References Cited, Foreign Patent Documents, "CN102594435A" should be listed.

Signed and Sealed this  
Third Day of March, 2020

Andrei Iancu  
*Director of the United States Patent and Trademark Office*